(12) United States Patent
Haymore

(10) Patent No.: US 9,256,043 B2
(45) Date of Patent: Feb. 9, 2016

(54) STRENGTH MEMBER SYSTEM FOR FIBER OPTIC CABLE

(75) Inventor: Daniel P. Haymore, Rural Hall, NC (US)

(73) Assignee: CORNING CABLE SYSTEMS LLC, Hickory, NC (US)

(*) Notice: Subject to any disclaimer, the term of this patent is extended or adjusted under 35 U.S.C. 154(b) by 447 days.

(21) Appl. No.: 13/425,007

(22) Filed: Mar. 20, 2012

(65) Prior Publication Data

US 2013/0202262 A1 Aug. 8, 2013

Related U.S. Application Data

(60) Provisional application No. 61/594,723, filed on Feb. 3, 2012.

(51) Int. Cl.
*G02B 6/44* (2006.01)

(52) U.S. Cl.
CPC ............ *G02B 6/4494* (2013.01); *G02B 6/4413* (2013.01); *G02B 6/443* (2013.01); *G02B 6/4429* (2013.01); *G02B 6/4434* (2013.01)

(58) Field of Classification Search
CPC .... G02B 6/443; G02B 6/4401; G02B 6/4432; G02B 6/4429; G02B 6/4434; G02B 6/4494; G02B 6/4413
USPC .......... 385/100, 102, 105–107, 109, 110–111
See application file for complete search history.

(56) References Cited

U.S. PATENT DOCUMENTS

| | | | |
|---|---|---|---|
| 4,241,979 A | 12/1980 | Gagen et al. | |
| 4,730,894 A * | 3/1988 | Arroyo | 385/113 |
| 4,815,813 A | 3/1989 | Arroyo et al. | |
| 5,249,248 A | 9/1993 | Arroyo et al. | 385/113 |
| 5,389,442 A * | 2/1995 | Arroyo et al. | 428/396 |
| 5,621,841 A | 4/1997 | Field | 385/113 |
| 5,642,452 A * | 6/1997 | Gravely et al. | 385/113 |
| 6,459,837 B1 * | 10/2002 | Fitz et al. | 385/113 |
| 6,500,541 B1 * | 12/2002 | Schoeck et al. | 428/372 |
| 6,501,888 B2 | 12/2002 | Gimblet et al. | 385/113 |
| 6,574,400 B1 * | 6/2003 | Lail | 385/109 |
| 6,681,071 B2 | 1/2004 | Newton et al. | 385/113 |
| 7,123,801 B2 | 10/2006 | Fitz | 385/105 |
| 2003/0215198 A1 * | 11/2003 | Newton et al. | 385/113 |
| 2013/0094821 A1 * | 4/2013 | Logan | G02B 6/4495 385/100 |

FOREIGN PATENT DOCUMENTS

| | | |
|---|---|---|
| EP | 314371 B1 | 7/1995 |
| EP | 1076253 B1 | 6/2008 |
| JP | 2005-202106 A | 7/2005 |

\* cited by examiner

*Primary Examiner* — Kaveh C Kianni
*Assistant Examiner* — Hung Lam
(74) *Attorney, Agent, or Firm* — William D. Doyle

(57) ABSTRACT

A fiber optic cable includes a strength member, a layer of polyethylene contacting the exterior of the strength member, and a yarn wound around the strength member. The yarn is between the strength member and the layer of polyethylene.

15 Claims, 6 Drawing Sheets

STRENGTH MEMBER SYSTEM FOR FIBER OPTIC CABLE

PRIORITY CLAIM

This application claims the benefit of priority under 35 U.S.C. §119 of U.S. Provisional Application Ser. No. 61/594,723 filed on Feb. 3, 2012, the entire content of which is relied upon and incorporated herein by reference in its entirety.

BACKGROUND

The present disclosure relates generally to fiber optic cables, and more specifically to strength member systems of fiber optic cables.

Fiber optic cables typically include strength members, such as glass-reinforced plastic rods that bear stresses experienced by the cables, so as to reduce the transfer of loading to optical fibers carried by the cables. Some loose tube cables include a central guide about which buffer tubes containing optical fibers are stranded (e.g., helically wound). The central guide may include a strength member core with an overcoat or "up-jacket" of additional material that increases the diameter of the central guide so that the buffer tubes have a desired lay length for stranding.

Traditionally, physical bonding and tightness of the overcoat around the strength member core blocks water from penetrating and traveling through the cable between the strength member and the overcoat. Achieving the bond typically relies upon tight extrusion process controls, and in cases of thicker overcoats also may rely upon two or more separate passes down an extrusion line to maintain water-penetration integrity, due to shrinkage of the overcoat material (e.g., up-jacketing compound) causing the overcoat to pull away from the strength member and form a gap through which water may penetrate.

As such, thicker walls for an overcoat are typically extruded in multiple passes to reduce the effects of shrinkage of the overcoat material during cooling, as opposed to a single pass. Furthermore, the overcoat walls may also limit the speed at which the line can run in order to further control the cooling rate. A need exists for a method of sealing an overcoat around a strength member, such as in the central guide of a loose tube fiber optic cable, that allows for a faster line speed and/or single pass down the line, thereby improving manufacturing efficiency.

SUMMARY

One embodiment relates to a fiber optic cable that includes a strength member, a layer of polyethylene contacting the exterior of the strength member, and a yarn wound around the strength member. The yarn is between the strength member and the layer of polyethylene.

Another embodiment relates to a method of manufacturing a fiber optic cable, which includes a step of winding a yarn about a strength member. The method includes another step of coating the strength member with a layer of polyethylene contacting the exterior of the strength member. The yarn is between the strength member and the layer of polyethylene.

Yet another embodiment relates to a fiber optic cable, which includes a guide. The guide includes a glass-reinforced plastic rod, a first water-swellable yarn, and a polymer overcoat overlaying the first yarn and the rod. The glass-reinforced plastic rod has a longitudinal axis extending in parallel or co-linearly with a longitudinal axis of the fiber optic cable. The first water-swellable yarn is helically wound around the rod. The fiber optic cable further includes a second water-swellable yarn helically wound around the exterior of the guide, buffer tubes stranded about the guide and overlaying the second yarn, and a polymer jacket overlaying the buffer tubes. The buffer tubes support optical fibers.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Before turning to the figures, which illustrate the exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

A system for blocking water along the interior of a guide formed from a central strength member and an overcoat (e.g., up-jacket) uses a water-swellable yarn helically wrapped around the strength member, before the up jacketing process. Although a tight overcoat may still be desired, the water blocking ability of the system may not be dependent on the tightness of the bond between the strength member and the overcoat material. If an end of the up jacketed guide is exposed to water, water-swellable elements in the yarn (e.g., super-absorbent powder (SAP)) will limit or block the passage of water down the interface between the strength member and the overcoat. As such, embodiments disclosed herein allow for an overcoat to be up jacketed to a strength member in fewer passes down a processing line and/or at higher line speeds.

Figure 1:
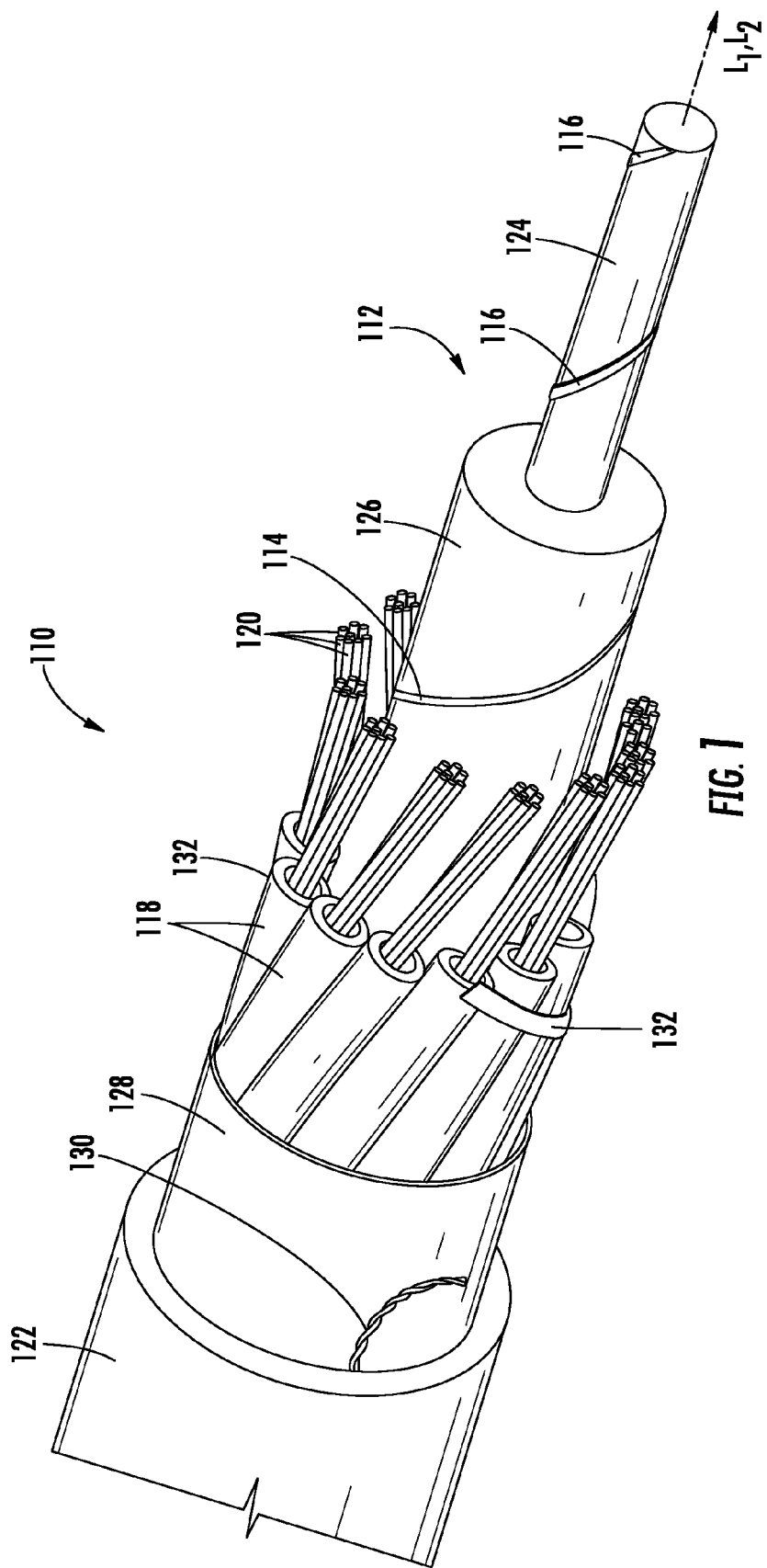
FIG. 1 is a perspective view of a fiber optic cable in a configuration intended to show components of the cable, according to an exemplary embodiment.

Referring now to FIG. 1, a fiber optic cable in the form of a central-strength-member, loose-tube fiber optic cable 110 includes a guide 112, water-swellable yarn 114 helically wound around the exterior of the guide 112, buffer tubes 118 stranded around the guide 112 and overlaying the yarn 114, and a polymer jacket 122 overlaying the buffer tubes 118. The buffer tubes 118 support optical fibers 120. The guide 112 includes a strength member 124, another water-swellable yarn 116, and a polymer overcoat 126 overlaying the yarn 116 and the strength member 124. In some embodiments, the strength member 124 is or includes a glass-reinforced plastic (GRP) rod having a longitudinal axis $L_1$ extending with a longitudinal axis $L_2$ of the fiber optic cable 110.

According to an exemplary embodiment, the fiber optic cable 110 further includes water-swellable tape 128 between the buffer tubes 118 and the polymer jacket 122, a rip cord 130 between the water-swellable tape 128 and the polymer jacket 122, and a binder 132 (e.g., binder yarns) wrapped around the buffer tubes 118. The buffer tubes 118, the water-swellable yarns 114, 116, and the binder 132 may be helically wound in either direction, counter-helically wound forming a crisscross pattern, S-Z stranded, or otherwise wound.

Figure 2:
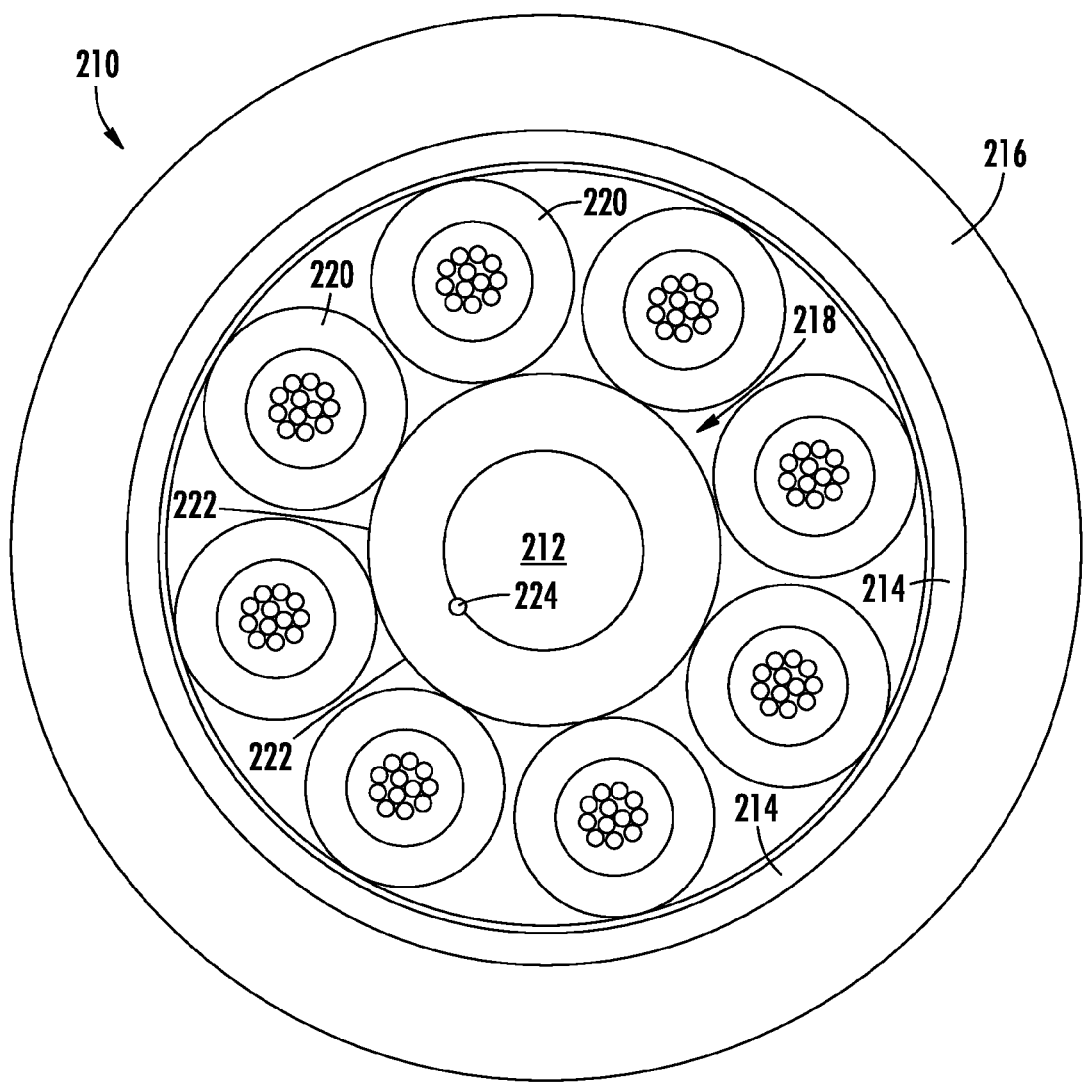
FIG. 2 is a sectional view of a fiber optic cable according to an exemplary embodiment.

Referring to FIG. 2, a fiber optic cable in the form of another central-strength-member, loose-tube fiber optic 210 cable includes strength elements in the form of a central strength member 212 (e.g., main load-bearing member) and may also include aramid yarns 214, fiberglass yarns, or other strength elements. According to an exemplary embodiment, the fiber optic cable 210 includes water-blocking material, such as filling compound, dry swellable materials (e.g., tape, yarn, etc.), polymers, or other materials. In some embodiments, the fiber optic cable includes a jacket 216, which may be formed from extruded polyethylene, polyvinyl chloride, or other jacketing materials. In some embodiments the jacket 216 further includes a nylon or vinyl skin (e.g., outermost surface layer). The material of the jacket 216 may include additives such as carbon black for UV protection.

Figure 3:
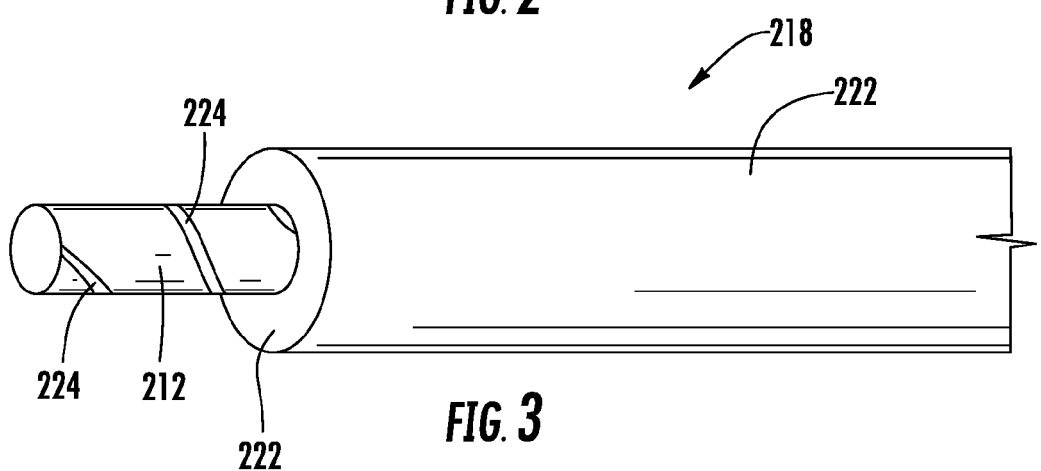
FIG. 3 is a perspective view of a central guide for a fiber optic cable according to an exemplary embodiment.

Referring to FIGS. 2-3, the fiber optic cable 210 further includes a central guide 218 around which buffer tubes 220 are stranded. According to an exemplary embodiment, the central guide 218 includes the strength member 212 (e.g., load-bearing core), which may be formed from resin bonded e-glass (e.g., type of GRP), resin bonded aramid, solid steel, stranded steel, or other materials. According to an exemplary embodiment, the strength member 212 has an elongate cylindrical body.

According to an exemplary embodiment, the strength member 212 has been up jacketed (e.g., over-coated) with an overcoat 222. In some embodiments, the overcoat 222 is formed from (e.g., largely consists of, at least 70-percent) a polymer material (e.g., up jacketing compound), such as polyethylene (e.g., medium or high density polyethylene (MDPE, HDPE)). In some embodiments, the overcoat 222 is formed from PVC, a low-smoke and fume (LSF) material, or another material.

According to an exemplary embodiment, the strength member 212 of the central guide 218 includes a yarn 224 (e.g., low-denier water-swell yarn) helically wound around the strength 212 member, between the strength member 212 and the overcoat 222. The yarn 224 may be drawn from a takeoff (e.g., spool) and wound around the strength member 212 by a rotating lead, prior to extruding the overcoat 222 over the strength member 212.

According to an exemplary embodiment, the yarn 224 is helically wound around the strength member 212, not placed linearly along side of the strength member 212. In other embodiments, yarn may be placed linearly along the strength member 212; or a combination of two yarns may be used, where one is helically wound and the other is linearly placed (see generally FIG. 4). According to an exemplary embodiment, the lay length of the yarn 224 is less than 1 meter. However, the lay length of the yarn 224 around the strength member 212 may vary due to yarn package size and pitch used to wind the yarn 224.

In some applications the overcoat 222 may be extruded over the strength member 212 at high-speeds down the associated manufacturing line, such as on the order of 60 to 80 meters per minute. For an overcoat having a thickness of about 1.5 to 1.7 mm or more, without use of the yarn 224, the overcoat 222 may be need to be applied to the strength member 212 in two or more passes in order to control the shrinkage of the overcoat 222 and avoid a gap between the strength member 212 and the overcoat 222. With the yarn 224, the overcoat 222 may be applied to the strength member 212 in a single pass, and any resulting gap between the strength member 212 and the overcoat 222 will be accounted for by the yarn 224.

According to an exemplary embodiment, the yarn 224 is 500-denier water-swell yarn, such as yarns commercially-available and produced by FIBER-LINE® and Fil-Tec, Inc. However, varying sizes of yarn may be used to apply different levels of water-blocking compound into the finished product. Additionally, multiple yarns of smaller size may be applied. Accordingly, this technology may be used with any combination of strength-member size and overcoat wall thickness to fill void(s) created therebetween due to up jacketing compound shrinkage during cooling.

Referring now to FIGS. 4-7, fiber optic cables 310, 410, 510, 610 include a strength member 312, 412, 512, 612, a layer of a polymer material 314, 414, 514, 614 (e.g., polyethylene) contacting the exterior of the strength member 312, 412, 512, 612, and a yarn 316, 416, 516, 616 (e.g., water-swellable yarn) wound around the strength member 312, 412, 512, 612, between the strength member 312, 412, 512, 612 and the respective layer of a polymer material 314, 414, 514, 614, similar to fiber optic cables 110, 210 shown in FIGS. 1-2.

Figure 4:
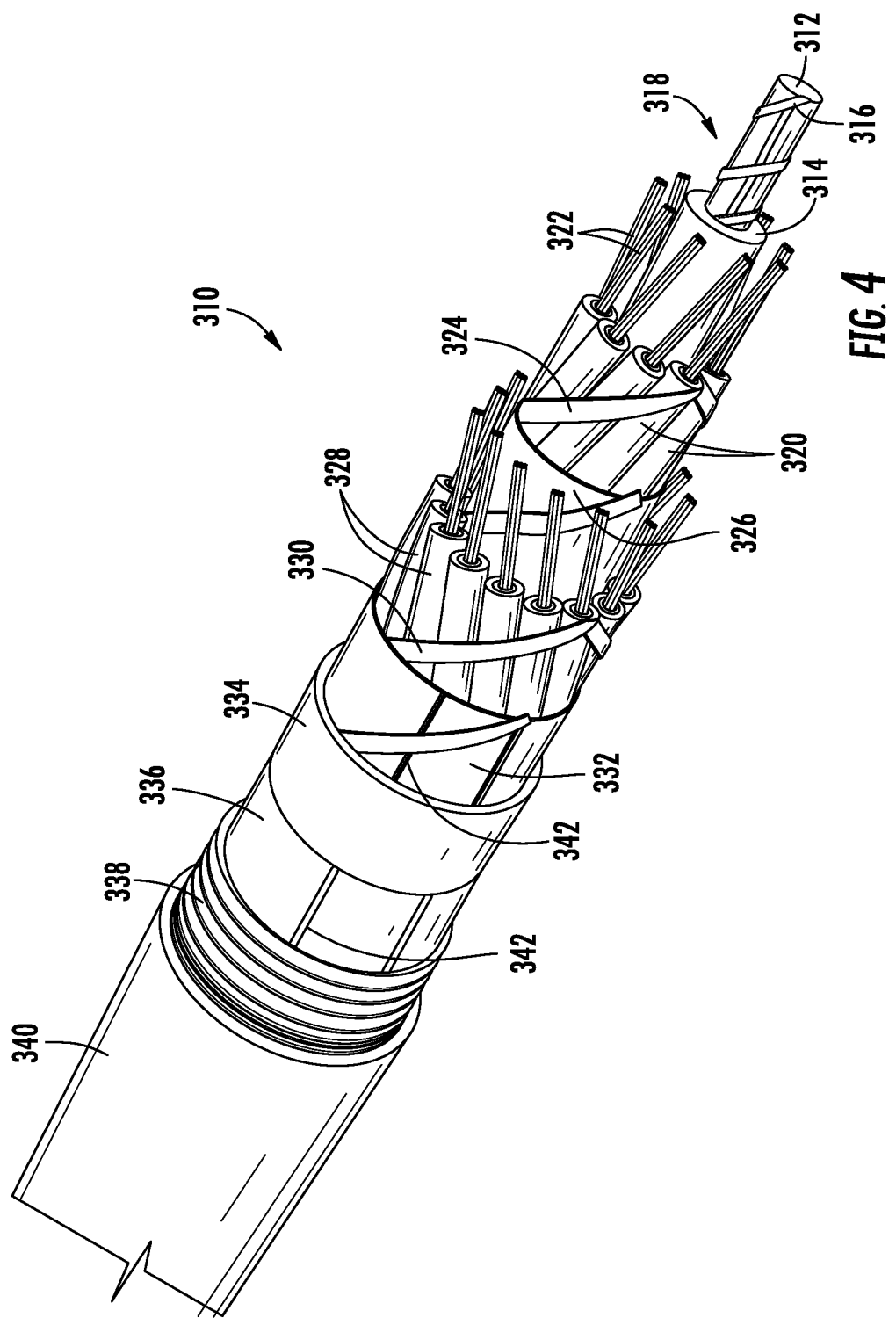
FIGS. 4-7 are perspective views of fiber optic cables according to other exemplary embodiments.

Referring more specifically to FIG. 4, the fiber optic cable 310 includes a central guide member 318 that includes the strength member 312, the overcoat 314, and the yarn 316. The yarn 316 includes at least two separate pieces, one wound helically and the other placed linearly along the strength member 312. Intersections of the pieces of yarn 316 may seal off areas of a void or gap between the strength member 312 and the overcoat 314.

According to an exemplary embodiment, in addition to the central guide member 318, the fiber optic cable 310 includes a first layer of buffer tubes 320 wound around the guide member 318. Each buffer tube 320 includes a 12-fiber bundle 322 of optical fibers and is filled with gel. A binder yarn 324 is wound around the first layer of buffer tubes 320 so that the buffer tubes 320 may be S-Z stranded about the guide member 318. Water-swellable tape 326 is positioned around the first layer of buffer tubes 320 and the binder yarn 324. A second layer of buffer tubes 328 is wound around the water-swellable tape 326, with another binder 330 holding the second layer of buffer tubes 328. Water-swellable tape 332 is wrapped around the second layer of buffer tubes 328 and binder 330 and is itself over-coated with an inner jacket 334, such as a polyethylene jacket. More water-swellable tape 336 and corrugated steel tape armor 338 is positioned over the inner jacket 334 and an outer jacket 340 is extruded over the armor 338. Rip cords 342 may be placed between the water-swellable tape 332 and the inner jacket 334 and between the water-swellable tape 332 and the armor 338.

Figure 5:
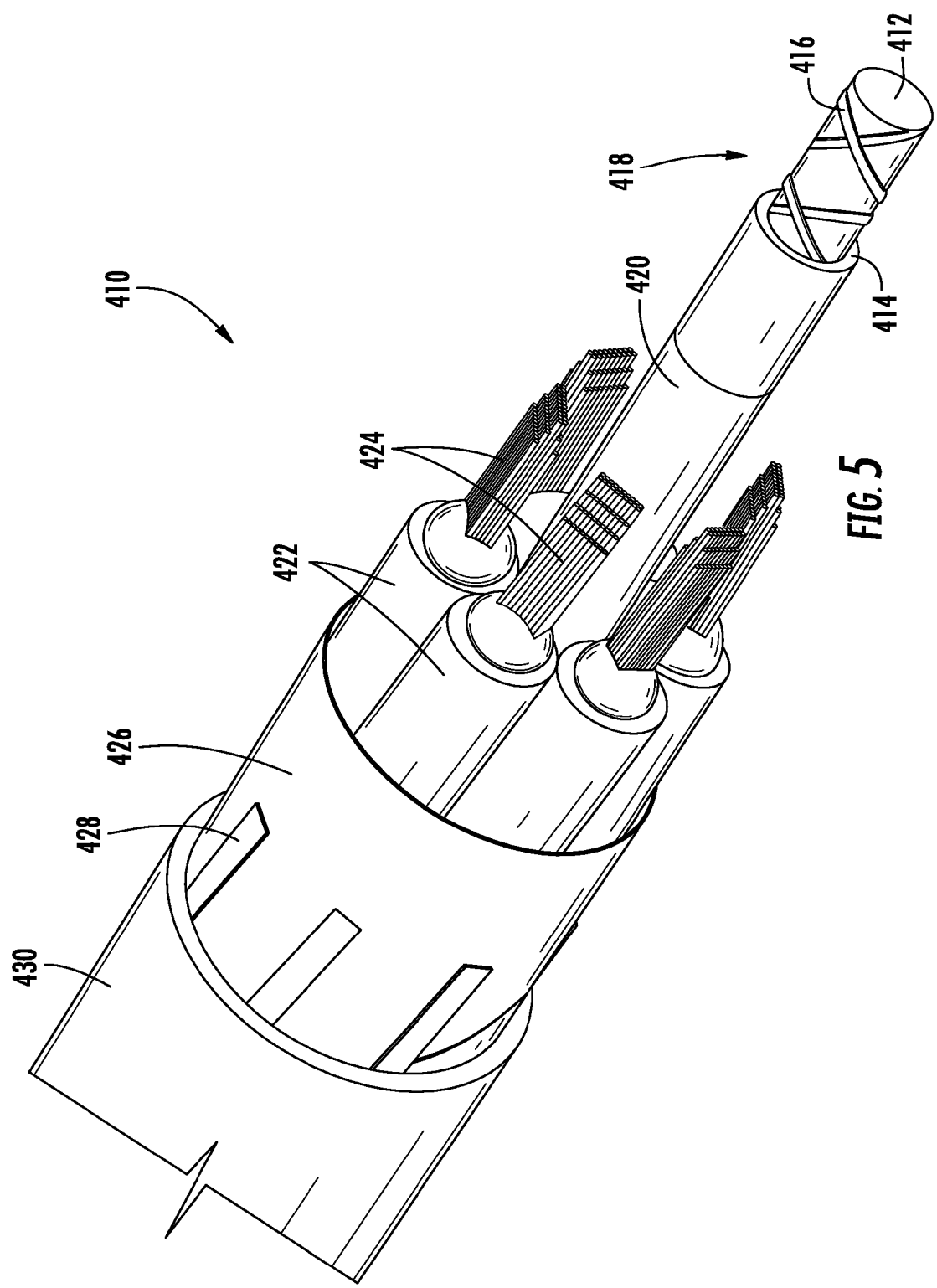

Referring to FIG. 5, the fiber optic cable 410 includes a central guide member 418 that includes the strength member 412, the overcoat 414, and the yarn 416. The yarn 416 includes at least two separate pieces that are counter-helically wound with respect to one another forming a crisscross pattern on the exterior surface of the strength member 412, between the strength member 412 and the overcoat 414. The intersections of the pieces of yarn 416 may seal off areas of a void or gap between the strength member 412 and the overcoat 414.

According to an exemplary embodiment, the fiber optic cable 410 further includes water swellable tape 420 wrapped around the exterior of the central guide member 418. Buffer tubes 422 filled with stacks of fiber optic ribbons 424 (e.g., 6-by-12 ribbon fiber stacks) are stranded around the central guide member 418. Additional water-swellable tape 426 is wrapped around the exterior of the layer of buffer tubes 422. Peripheral strength members 428 (e.g., aramid strips) are positioned around the water-swellable tape 426, and the contents of the fiber optic cable 410 are jacketed with a layer 430 of polymer material, such as polyethylene.

Figure 6:
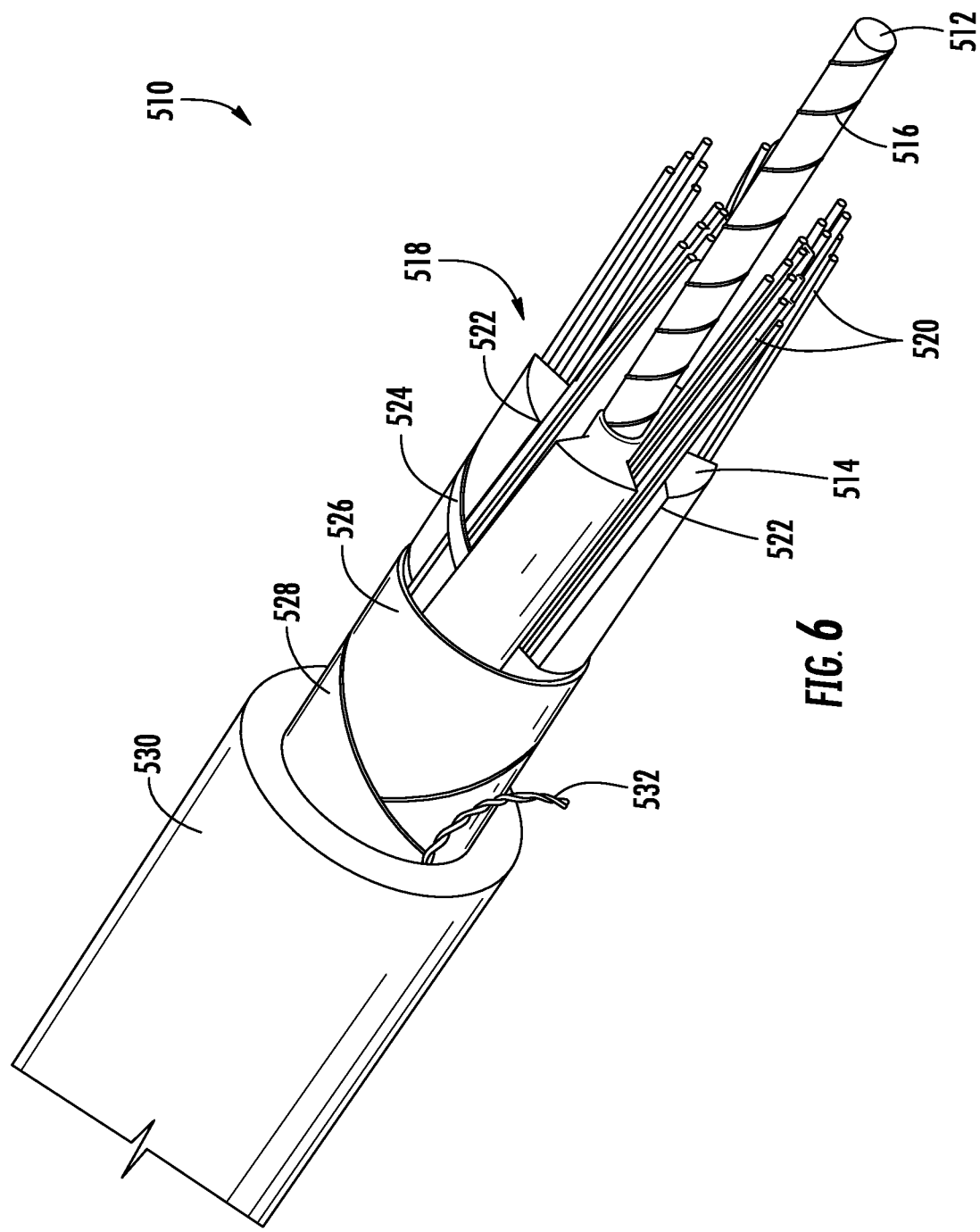

Referring to FIG. 6, the fiber optic cable 510 includes a central guide member 518 (e.g., helically-slotted core) that includes the strength member 512, the overcoat 514 in the form of a helically-slotted overcoat, and the yarn 516. In some embodiments, the strength member 512 is a steel strength member (e.g., solid steel or stranded). In other embodiments, the strength member 512 is a GRP rod. In some embodiments the helically-slotted overcoat 514 is formed from a polyolefin material.

According to an exemplary embodiment, stacks of fiber ribbons 520 (e.g., 5-by-4 fiber ribbons) are positioned in slots 522 of the helically-slotted overcoat 514. A binder 524 is placed around the exterior of the helically-slotted overcoat 514 to hold the stacks of fiber ribbons 520 in place. Water-swellable tape 526 is wrapped around the helically-slotted overcoat 514 and binder 524. An additional binder 528 is wrapped around the water-swellable tape 526. A jacket 530 is extruded over the water-swellable tape 526 with a rip cord 532 positioned between the water-swellable tape 526 and the jacket 530.

Figure 7:
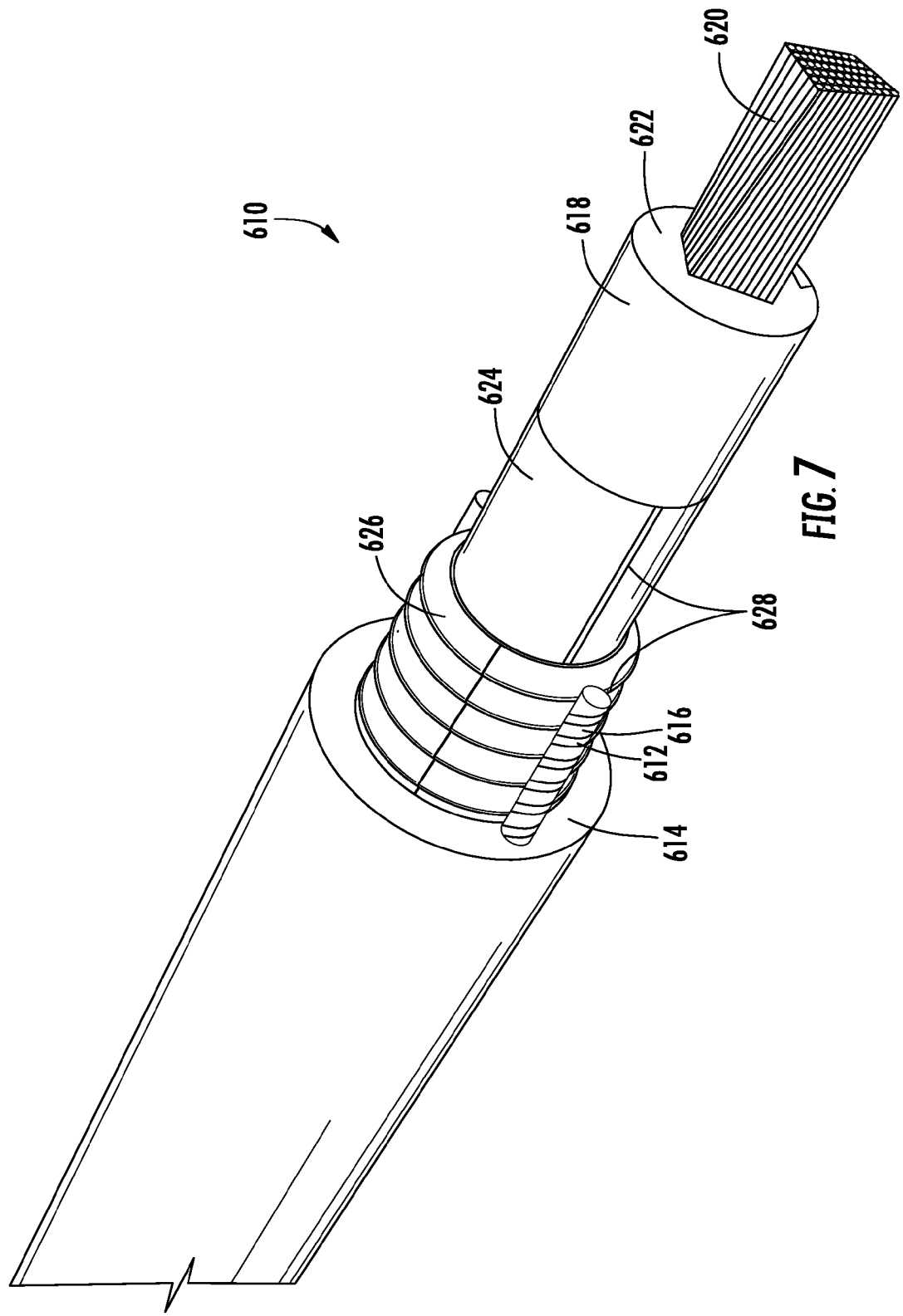

Referring to FIG. 7, the fiber optic cable 610 is in the form of a central-tube ribbon cable. The strength member 612, the overcoat 614 in the form of a jacket for the fiber optic cable 610, and the yarn 616 are positioned to the side of a center tube 618 (e.g., buffer tube). The center tube 618 is filled with a stack of ribbons 620, such as 12-fiber ribbons. Filling gel 622 seals the stack of ribbons 620 in the center tube 618. Water swellable tape 624 is wrapped around the exterior of the center tube 618 and corrugated armor 626 is positioned around the tape 624. The overcoat 614, in the form of the jacket, is extruded over the armor 626 as well as the strength member 612 and yarn 616. Rip cords 628 are placed between the water-swellable tape 624 and the armor 626, and between the armor 626 and the overcoat 614.

In other contemplated embodiments, water-swell compound may also be placed between the strength member and upjacketing compound in the form of water-blocking tapes and other types of yarns and threads as the carrier medium. Loose particles of water-swell compound may also be blown into the area between strength member and overcoat during extrusion, as disclosed in U.S. Pat. Nos. 7,630,605 and 7,983,989 and U.S. application Ser. No. 13/020,174 filed Feb. 3, 2011, each of which is incorporated herein by reference as though fully set forth in its entirety. In some embodiments, water-swell compound may also be applied to the surface of a GRP strength member during manufacturing of the GRP.

Some technology disclosed herein is intended to solve problems associated with applying polyethylene compound around a glass-reinforced plastic rod, such as the subsequent shrinkage of the polyethylene due to cooling that may result in water-penetration failures of the combined structure. Furthermore, technology disclosed herein may allow for efficiency gains and cost savings due to reduced manufacturing time going from a multiple-pass solution to a single-pass solution. Technology disclosed herein may also allow for line speed increases as well as enhanced water-blocking robustness relative to current methods.

The construction and arrangements of the strength member system for fiber optic cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, other types of optical fiber cable may benefit from the technology disclosed herein, such as drop cable, low-smoke zero-halogen plenum/riser cable, and other types of cable and cable assemblies. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic cable, comprising:
   a central strength member coaxially located within the fiber optic cable;
   a layer of polyethylene contacting the exterior of the strength member;
   a water-swellable yarn wound around the strength member, between the strength member and the layer of polyethylene; and
   buffer tubes supporting optical fibers,
   wherein the layer of polyethylene is an overcoat completely surrounding both the central strength member and the yarn in the circumferential direction such that together the central strength member and the overcoat form a guide over which the buffer tubes are stranded.

2. The fiber optic cable of claim 1, wherein strength member is a glass-reinforced plastic rod having a longitudinal axis extending in parallel or co-linearly with a longitudinal axis of the fiber optic cable.

3. The fiber optic cable of claim 2, wherein the yarn is helically wound around the strength member.

4. The fiber optic cable of claim 1, wherein the water-swellable yarn comprises a super-absorbing polymer.

5. The fiber optic cable of claim 1, wherein the yarn between the strength member and the layer of polyethylene consists of a single piece of yarn that is helically wound.

6. A method of manufacturing a fiber optic cable, comprising steps of:
   winding a water-swellable yarn around a strength member;
   coating the strength member with a layer of polyethylene contacting the exterior of the strength member, wherein the yarn is between the strength member and the layer of polyethylene and the layer of polyethylene is an overcoat completely surrounding both the central strength member and the yarn in the circumferential direction; and stranding buffer tubes, which are supporting optical fibers, around a guide formed by the overcoat, the yarn, and the central strength member.

7. The method of claim 6, wherein the step of winding further comprises helically winding the yarn around the strength member.

8. The method of claim 7, wherein strength member is a glass-reinforced plastic rod having a longitudinal axis extending in parallel or co-linearly with a longitudinal axis of the fiber optic cable.

9. The method of claim 6, wherein the water-swellable yarn comprises a super-absorbing polymer.

10. The method of claim 6, wherein the strength member is a central strength member coaxially located within the fiber optic cable.

11. The method of claim 6, wherein the yarn between the strength member and the layer of polyethylene consists of a single piece of yarn that is helically wound.

12. The method of claim 6, wherein the step of winding further comprises counter-helically winding separate pieces of the yarn around the strength member such that the pieces form a crisscross pattern with respect to one another around the strength member.

13. A fiber optic cable, comprising:
a guide, comprising:
a glass-reinforced plastic rod having a longitudinal axis extending in parallel or co-linearly with a longitudinal axis of the fiber optic cable,
a first water-swellable yarn helically wound around the rod; and
a polymer overcoat overlaying and completely surrounding both the first yarn and the rod in the circumferential direction;
a second water-swellable yarn helically wound around the exterior of the guide;
buffer tubes stranded around the guide and overlaying the second yarn, wherein the buffer tubes support optical fibers; and
a polymer jacket overlaying the buffer tubes.

14. The fiber optic cable of claim 13, wherein the polymer of the jacket and the polymer of the overcoat are the same material.

15. The fiber optic cable of claim 14, wherein the polymer of the jacket and the overcoat is polyethylene.

* * * * *